Sept. 6, 1949.  C. E. WHITTLE  2,480,893
HAND-GUIDED POWER-DRIVEN TWO-WHEELED PORTABLE SAW
Filed Jan. 31, 1947  4 Sheets-Sheet 1
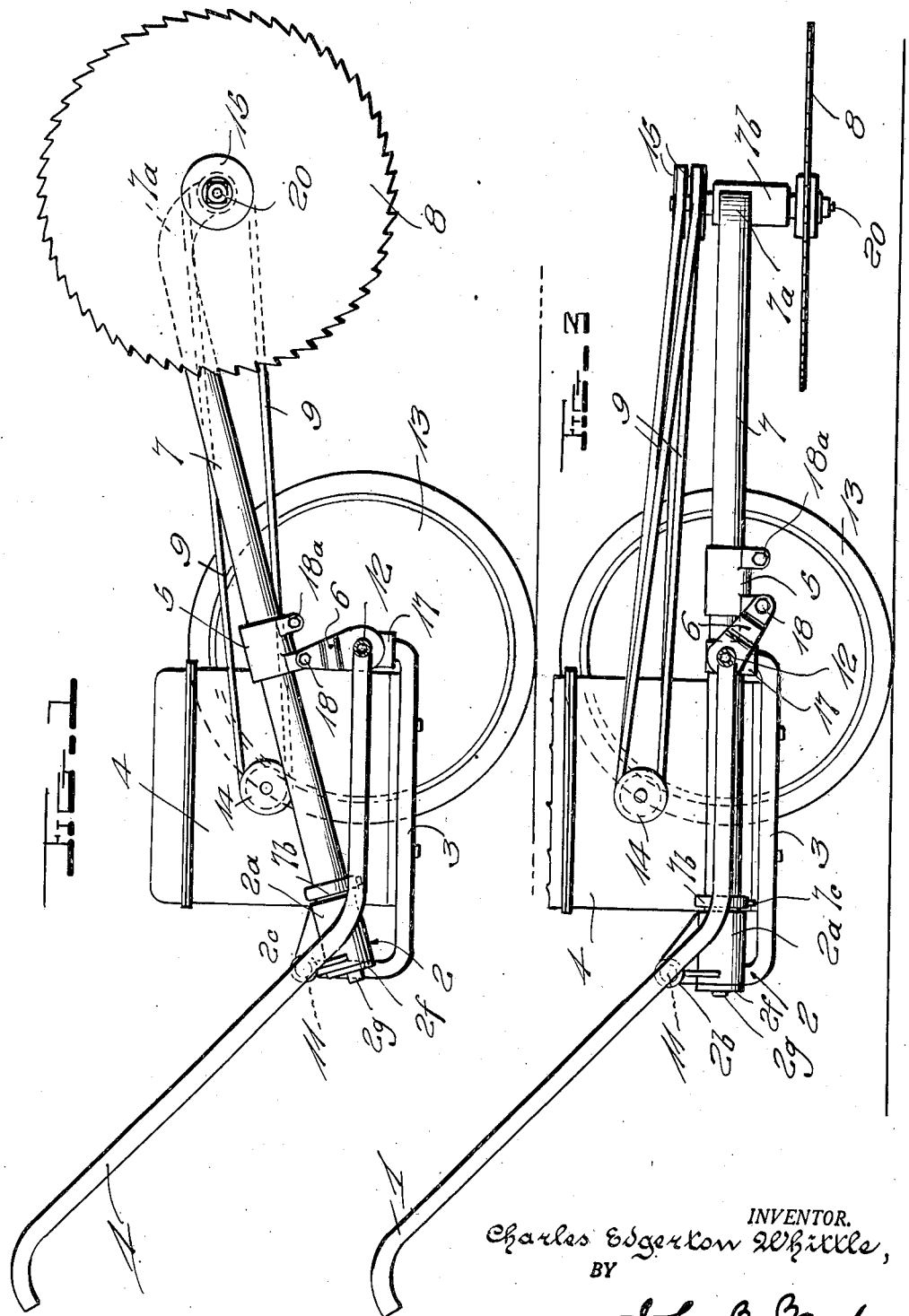
INVENTOR.
Charles Edgerton Whittle,
BY
John B. Brady
ATTORNEY

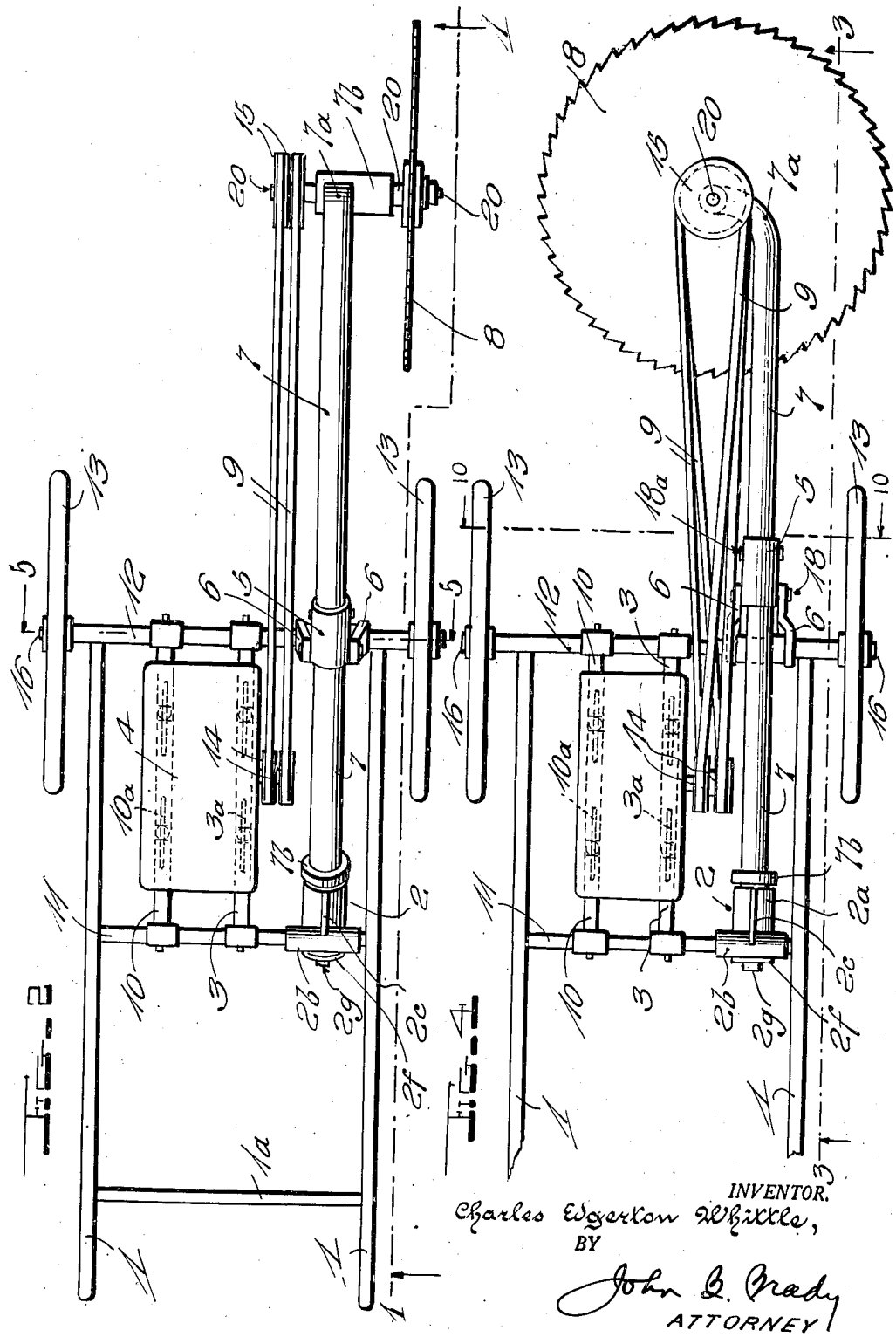

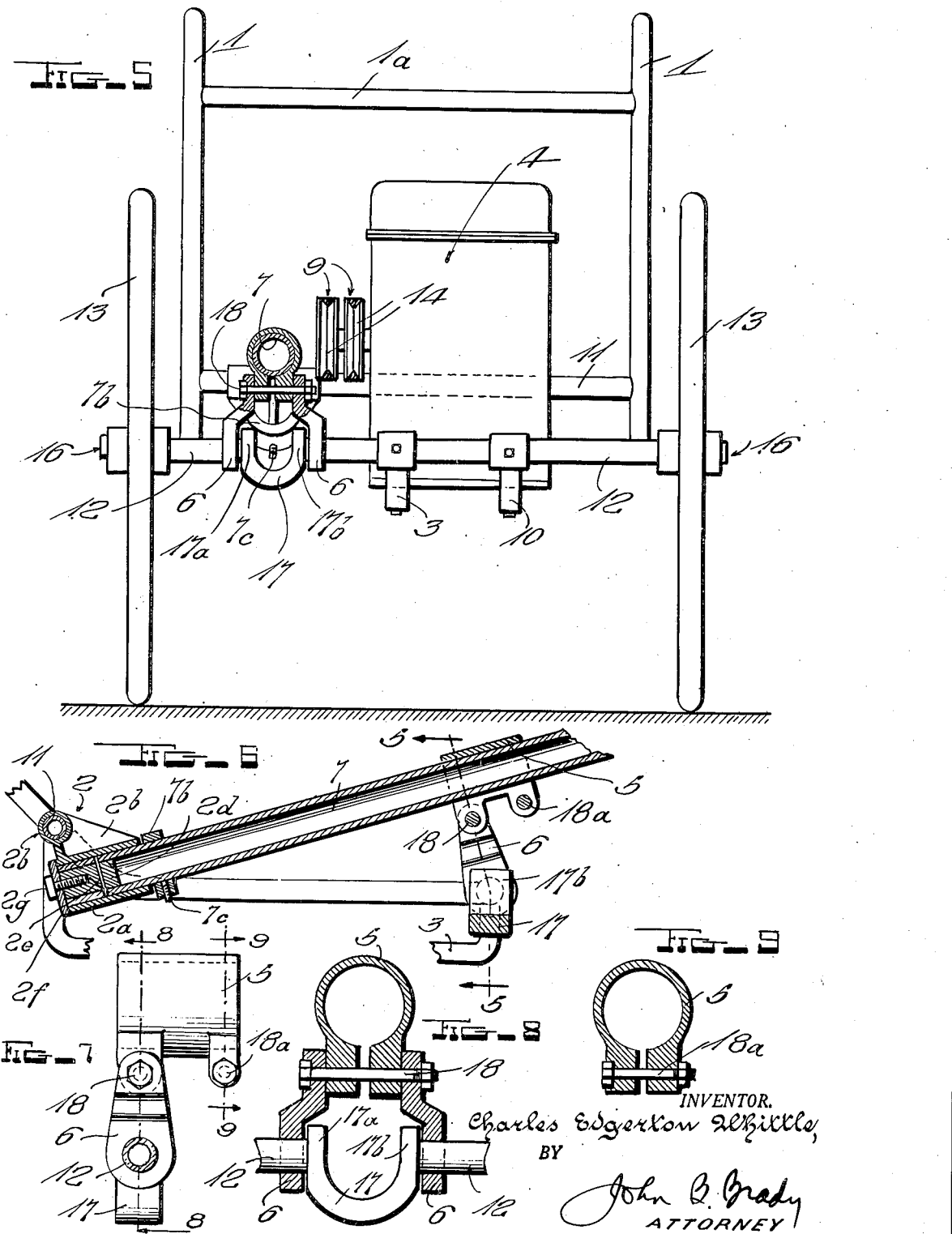

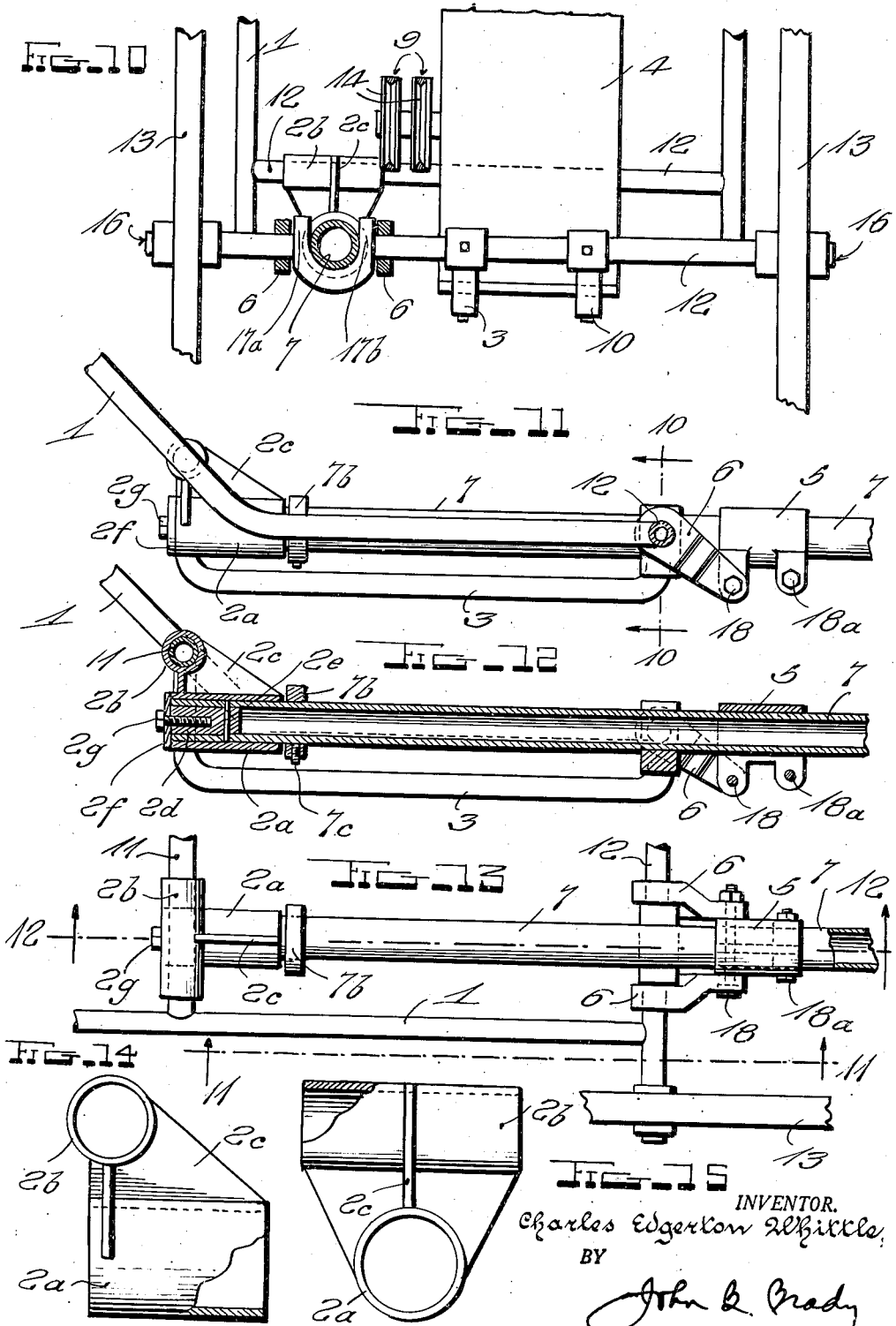

Patented Sept. 6, 1949

2,480,893

UNITED STATES PATENT OFFICE 2,480,893

HAND-GUIDED POWER-DRIVEN TWO-WHEELED PORTABLE SAW

Charles Edgerton Whittle, Brunswick, Ga., assignor to Tidewater Equipment Co., Brunswick, Ga., a partnership Application January 31, 1947, Serial No. 725,624

3 Claims. (Cl. 143—43)

My invention relates broadly to portable power saws and more particularly to a compact construction of portable power saw which may be readily maneuvered and controlled by one person.

One of the objects of my invention is to provide an improved construction of portable power saw which may be manufactured inexpensively on a mass production basis for performing efficient sawing operations both in the felling and bucking of timber and brush.

Another object of my invention is to provide an improved construction of power saw in which the frame support for the saw and the driving and adjusting mechanism thereof are dynamically balanced so that minimum physical effort is required in moving or progressively adjusting the cutting position of the saw.

A further object of my invention is to provide an arrangement of multiple belt driven rotary power saw including a mandrel assembly for supporting the rotary driven saw where the mandrel assembly may be moved throughout a range of operating positions for the felling of timber throughout a selected range of stump heights and for bucking large or small timber with selected diameter circular saw blades.

Still another object of my invention is to provide a construction of power driven portable circular saw which is readily controllable from a driving engine mounted on a portable chassis with means for maintaining tension on a multiple driving belt system throughout various positions of the saw extending throughout a range between vertical and horizontal planes.

Still another object of my invention is to provide an improved arrangement for mounting a dynamically balanced rotary saw with respect to a hand operated chassis wherein a mandrel is provided for mounting the saw which mandrel is movable from a position substantially below the chassis to a position above the chassis while maintaining a condition of dynamic balance.

Still another object of my invention is to provide a construction of chassis for a power driven rotary saw having a high degree of stability in which a dynamic chassis is provided with a downwardly extending yoked portion with respect to which a mandrel assembly may be variably positioned for driving the saw from an engine carried by the chassis while maintaining a condition of stabilized equilibrium throughout a wide range of positions for the saw.

Other and further objects of my invention reside in the improved power saw assembly and details of construction thereof as set forth more fully in the specification hereinafter following by reference to the accompanying drawings in which:

Figure 1 is a vertical sectional view taken substantially on line 1—1 of Fig. 2 and illustrating the saw assembly in side elevation, showing the mandrel adjusted to a position in which the circular saw is used for bucking timber, that is, cutting felled timber into desired lengths; Fig. 2 is a top plan view of the portable saw illustrated in Fig. 1; Fig. 3 is a vertical sectional view through the portable saw with the mandrel moved to adjust the circular saw to a position for felling timber, the view being taken substantially on line 3—3 of Fig. 4; Fig. 4 is a top plan view of the portable saw shown in Fig. 3 with the circular blade adjusted to timber felling position; Fig. 5 is a vertical sectional view taken substantially on line 5—5 of Fig. 2 and on line 5—5 of Fig. 6; Fig. 6 is a fragmentary longitudinal sectional view taken through the suspension for the mandrel; Fig. 7 is a side elevational view of the adjustable support for the mandrel and illustrating particularly the relationship of the adjustable support to the yoke in the chassis of the saw frame; Fig. 8 is a transverse sectional view taken substantially on line 8—8 of Fig. 7 and illustrating particularly the yoke provided in the chassis of the frame support for allowing entry of the mandrel for maintaining stabilization of the saw and allowing the saw to be moved close to the surface of the ground in felling operations; Fig. 9 is a transverse sectional view through the mandrel support taken substantially on line 9—9 of Fig. 7; Fig. 10 is a vertical sectional view taken substantially on line 10—10 of Fig. 4 and 10—10 of Fig. 11 and showing the mandrel lowered to a position entering the yoked chassis; Fig. 11 is a fragmentary side elevational view of the mandrel and the relation thereof to the yoked chassis when in the lowest adjusted position, the view being taken longitudinally of the chassis substantially on line 11—11 of Fig. 13; Fig. 12 is a longitudinal sectional view through the mandrel in its lowest adjusted position on substantially line 12—12 of Fig. 13; Fig. 13 is a fragmentary plan view of the end of the adjustable mandrel and showing the relation thereof to the yoked chassis with the saw adjusted to the lowest cutting position; Fig. 14 is a side elevational view partially broken away and illustrated in section showing one of the fittings for supporting the adjustable mandrel with respect to the chassis of the portable saw and Fig. 15 is a front view of the fitting illustrated in Fig.

14 with a portion thereof broken away and shown in section.

Referring to the drawings in detail the chassis of the portable saw is shown constructed from tubular conduit or pipe 1 forming handles which may be grasped for moving the portable saw into the area where the saw is to be operated. The chassis 1 is suitably braced by transverse members represented at 1a, 11 and 12. The transverse member 12 constitutes an axle assembly supported by the wheels 13. The engine 4 has the mass thereof so distributed with respect to the chassis that the engine serves as a counterweight with respect to the balance of the mechanism and has a pendulum effect in weight distribution. This property of the apparatus of my invention has proven very advantageous as contrasted to the usual conventional practice of locating the engine in such a position above the axle that the weight requires progressively greater operating effort to control the machine as it is inclined either forward or backward from the horizontal. In my construction I provide a pair of engine suspension members 3 and 10 extending below the transverse plane of members 11—12. The suspension members 3 and 10 are slotted as represented at 3a and 10a to allow bolts to extend through the slotted base from the engine 4 to enable the engine 4 to be adjusted longitudinally of the chassis in order to properly balance the machine, and adjust the tension on the driving belts.

A mandrel shaft 7 is provided for the machine of my invention in a position extending longitudinally of the chassis and off center with respect thereto. The rear end support for the mandrel shaft 7 is represented at 2 in the form of a substantially T-shaped fitting embracing the end of the mandrel shaft 7 at 2a and embracing the transversely extending member 11 at 2b. The T-shaped fitting 2 is free to swivel about transverse member 11 for raising or lowering mandrel shaft 7. The mandrel shaft 7 is provided with a curved front end portion 7a which terminates in a sleeve bearing 7b disposed on an axis extending in a direction substantially normal to the longitudinal plane of the mandrel shaft 7 and serving as a journal for the shaft 20 of the rotary saw blade 8. The shaft 20 carries on the end thereof a pair of driven sheaves 15 which are engaged by a pair of driving belts 9 driven from the engine sheaves 14 operated by engine 4.

The mandrel shaft 7 is supported intermediate the rear end and the front end thereof by means of a split sleeve clamp 5 which is movable to various positions within a range of travel for guiding mandrel shaft 7 in an orbit for selectively setting the rotary saw blade 8 in various angular positions or a vertical or a horizontal position depending upon whether the saw is to be used for bucking or felling. The blade 8 by virtue of the operation of split sleeve clamp 5 may be set vertically in a range of heights less than the fully raised position and set horizontally not necessarily in the fully lowered position as shown in Fig. 3, for example, to cut a low stump but in a somewhat elevated horizontal position to cut medium stumps or fully raised to cut above a "swell butt" or heavy "turpentine face."

The split sleeve clamp 5 has the parallel extending side portions thereof fastened by bolt members 18 and 18a which pass through the side portions of the split sleeve clamp 5 and through a pair of arms 6 as shown at 18, the arms 6 being journalled on the transverse tubular member 12 constituting the axle of the machine. The transverse tubular member 12 which carries the wheels 13 is provided with a downwardly extending yoke 17 disposed permanently in the transverse tubular member 12 in a position offset from the longitudinal center line of the chassis and forming a U drop in the tubular member 12. Axle spindles 16 are inserted into the transverse tubular member 12 to serve as journals for the wheels 13. The yoke 17 projecting beyond the transverse limits of the transverse tubular member 12 forms flanges or limiting stops 17a and 17b against which the arms 6 abut as shown in Fig. 8. Arms 6 may be angularly adjusted around transverse tubular member 12 on opposite sides of the yoke 17. Bolt members 18 and 18a may be loosened to permit this adjustment and thus mandrel shaft 7 is guided and controlled in a vertical plane through yoke 17 at the same time that mandrel shaft 7 may be angularly adjusted in accordance with the position in which the rotary saw 8 is to be used. When the rotary saw 8 is moved to selected position the bolt 18 may be tightened to clamp the split sleeve 5 around mandrel shaft 7 at the same time that arms 6 are clamped against the opposite flanges 17a and 17b of yoke 17 to hold the mandrel shaft 7 firmly in the selected position. Thus the fitting constituted by the split sleeve clamp 5 may be elevated or lowered to control the vertical angular position of mandrel shaft 7, the split sleeve clamp 5 being slidable along mandrel shaft 7 as represented, for example, in Figs. 3, 4 and 10–13 to permit mandrel shaft 7 to drop into U drop axle 12. That is to say, split sleeve clamp 5 has translatory movement with respect to mandrel shaft 7 and serves as a means for raising and lowering mandrel shaft 7 at the same time that mandrel shaft 7 is free to twist angularly within the split sleeve clamp 5. The lower limit of the position of split sleeve clamp 5 is illustrated in Figs. 3, 4 and 10–13 while the upper limit of the position of split sleeve clamp 5 is shown in Figs. 1, 2, 5, 6, 7 and 8. Various intermediate positions of the mandrel shaft 7 are possible by loosening and retightening split sleeve clamp 5 with respect to mandrel shaft 7.

A condition of stable equilibrium for the machine is maintained by virtue of the low center of mass secured by the mounting of engine 4 below the center of the axis of the supporting wheels 13. The equilibrium is increased as the mandrel shaft 7 drops into the yoke 17. When fully lowered the mandrel shaft 7 has a common center with the center line of the axle 12. The elevation of mandrel shaft 7 above axle 12 does not disturb the condition of equilibrium as ample counter-balance is afforded by the mass of the engine 4.

The shaping of the mandrel shaft 7 is one of the important features of my invention where curved end 7a of mandrel shaft 7 serves to maintain sheave alignment between sheaves 14 and 15 for the range of the one-quarter turn drive. The curved shape of the front end of mandrel shaft 7 at 7a is very important in order to position sheaves 15 with respect to sheaves 14 to reduce wear on belts 9 and to prevent belts 9 from jumping off at sheaves 14. Fig. 3 shows the maximum twist required of the driving belts 9 in driving saw 8 from driving sheaves 14 to driven sheaves 15 while maintaining constant belt tension. The T-shaped fitting 2 performs the dual function of supporting the rear end of the mandrel shaft 7 so that shaft 7 may be revolved to position the saw 8 from horizontal to vertical and because of the offset construction provided by curved end 7a maintain constant belt tension between sheaves 14 and 15 when mandrel shaft 7 is raised. Sheave 14 is fixed in elevation for each construction and size of engine 4. When mandrel shaft 7 is raised as in Figs. 1 and 2 the distance between driving sheave 14 and driven sheave 15 decreases and belts 9 tend to become slack. However, fitting 2 is designed to compensate for this variation and maintain a constant distance between sheaves 14 and 15. This is accomplished by reason of the offset construction of the T-shaped fitting 2 as shown more particularly in Figs. 6, 14 and 15.

The sleeve portion 2a of fitting 2 is connected through web 2c with the transversely extending sleeve 2b. Sleeve 2b is journalled upon the transverse member 11. The end of the mandrel shaft 7 enters sleeve 2a as a socket and has a plug 2d secured in the end of the mandrel 7 by means of transverse rivet 2e. A flange 2f which extends peripherally into abutment with the circular end of mandrel shaft 7 and the circular end of sleeve 2a is fastened in plug 2d by screw member 2g. Mandrel shaft 7 is further restricted with respect to sleeve 2a by means of flange member 7b which is adjustably secured thereto by set screw 7c thus locating the rear end of mandrel shaft 7 with respect to sleeve 2a in a manner in which mandrel shaft 7 is free to be angularly adjusted but is restricted from removal. While the confining parts are effective to maintain the position of mandrel shaft 7 so that it is free for angular adjustment as soon as released by split sleeve clamp 5, disassembly is, nevertheless, readily possible for repair, replacement of parts and routine maintenance.

In operation of the portable saw of my invention trees and brush may be felled by moving the saw under control of handle members 1 while the saw is being driven by the engine 4 into position for felling trees and brush as represented in Figs. 3 and 4. For bucking the logs thus felled for sawing the logs into desired lengths, the bolts 18 and 18a are loosened and mandrel shaft 7 raised. In moving from the lowermost position illustrated in Figs. 3 and 4 to the elevated position shown in Figs. 1 and 2 mandrel shaft 7 revolves through an angle of substantially 90°. Bolts 18 and 18a are then tightened for maintaining the saw 8 in the operating position illustrated in Figs. 1 and 2 for bucking.

I have found the construction and arrangement of parts as described herein highly efficient in the manufacture and production of the saw of my invention and while I have described my invention in one of its preferred embodiments, I realize that modifications and changes may be made and I desire that it be understood that no limitations upon my invention are intended other than may be imposed by the scope of the appended claims.

What I claim as new and desire to secure by Letters Patent of the United States is as follows:

1. A rotary power saw, comprising a frame structure, an axle member extending transversely of said frame structure, a wheeled support for said axle member, an engine support mounted at one side of said axle member for receiving an engine adjustably thereon and serving as a counterweight for said frame structure, said axle having a U-shaped yoke therein offset from said engine support, a mandrel shaft having one end thereof pivotally and angularly mounted with respect to said frame structure and being curved at the opposite end thereof and terminating in a journal, a shaft rotatably mounted in said journal, a rotary saw carried by said shaft, means extending between said engine and the shaft in said journal for rotatably driving said rotary saw for all positions of said mandrel shaft from a remote position housed within the U-shaped yoke of said axle to a position extending above said axle, a sleeve member slidably engageable with said mandrel shaft, angularly adjustable arms extending between said axle on opposite sides of the U-shaped yoke therein and said sleeve, and means for mutually clamping said arms and sleeve in selected positions for maintaining said mandrel shaft in a selected position.

2. In a portable saw, a chassis including a transversely extending axle, a wheeled support for said axle, a frame structure depending downwardly from said chassis below said axle, an engine mounting means carried by said frame structure, an engine adjustably mounted on said engine mounting means and adjustable toward or away from said axle to form a counterweight for said chassis, a socket-like bearing depending downwardly from said frame structure in a position adjacent one side of said chassis, a mandrel shaft having one end thereof extending into said socket-like bearing and having the other end thereof curved to provide a support for a sleeve-like journal, a rotary shaft journalled in said sleeve-like journal, a rotary saw carried by said shaft, means extending between said rotary shaft and said engine for driving said rotary saw throughout a range of horizontal and vertical positions of said saw extending through an angular distance of approximately 90°, a pair of arms journalled with respect to said axle and a sleeve-like member slidable on said mandrel shaft and connected with said arms for maintaining said mandrel shaft in a selected position.

3. In a portable saw, a chassis including a transversely extending axle, a wheeled support for said axle, a frame structure depending downwardly from said chassis below said axle, an engine mounting means carried by said frame structure, an engine adjustably mounted on said engine mounting means and adjustable toward or away from said axle to form a counterweight for said chassis, said axle including a depending U-shaped yoke portion displaced from the axis of said engine mounting means, a socket-like bearing depending downwardly from said frame structure in a position adjacent one side of said chassis in longitudinal alignment with the depending U-shaped yoke in said axle, a mandrel shaft having one end thereof extending into said socket-like bearing and having the other end thereof curved to provide a support for a sleeve-like journal, a rotary shaft journalled in said sleeve-like journal, a rotary saw carried by said shaft, means extending between said rotary shaft and said engine for driving said rotary saw throughout a range of horizontal and vertical positions of said saw extending through an angular distance of approximately 90°, a pair of arms journalled on said axle on opposite sides of the depending yoke therein, and a sleeve embracing said mandrel shaft and pivotally connected with the ends of said arms, said sleeve and arms being adjustable to clamp said mandrel shaft in a selected position for maintaining the plane of operation of said rotary saw.

CHARLES EDGERTON WHITTLE.

REFERENCES CITED

The following references are of record in the file of this patent:

UNITED STATES PATENTS

| Number | Name | Date |
|---|---|---|
| 2,353,873 | Brownlee | July 18, 1944 |

FOREIGN PATENTS

| Number | Country | Date |
|---|---|---|
| 27,542 | Sweden | Oct. 16, 1909 |
| 122,266 | Great Britain | Jan. 23, 1919 |
| 84,732 | Switzerland | Apr. 16, 1920 |
| 620,956 | France | Jan. 25, 1927 |
| 118,961 | Australia | Sept. 12, 1944 |